United States Patent
MacDonald et al.

(10) Patent No.: US 11,629,858 B2
(45) Date of Patent: Apr. 18, 2023

(54) TURBOEXPANDER INTER-STAGE HEATING AND NH3 CRACKING

(71) Applicant: Raytheon Technologies Corporation, Farmington, CT (US)

(72) Inventors: Malcolm MacDonald, Bloomfield, CT (US); Sean C. Emerson, Broad Brook, CT (US); Brian M. Holley, Eastford, CT (US); Lance L. Smith, West Hartford, CT (US); Peter Cocks, South Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 17/665,063

(22) Filed: Feb. 4, 2022

(65) Prior Publication Data
US 2022/0299205 A1    Sep. 22, 2022

Related U.S. Application Data

(60) Provisional application No. 63/164,020, filed on Mar. 22, 2021.

(51) Int. Cl.
*F02C 7/224* (2006.01)
*F02C 3/22* (2006.01)
(Continued)

(52) U.S. Cl.
CPC ............. *F23R 3/40* (2013.01); *F02C 3/20* (2013.01); *F02C 3/205* (2013.01); *F02C 3/22* (2013.01); *F02C 3/30* (2013.01); *F02C 6/003* (2013.01); *F02C 7/224* (2013.01); *F05D 2240/12* (2013.01); *F05D 2240/35* (2013.01); *F05D 2260/213* (2013.01); *F05D 2300/611* (2013.01); *F23R 2900/00004* (2013.01)

(58) Field of Classification Search
CPC .......... B01J 19/18; B01J 19/1812; F02C 3/20; F02C 3/205; F02C 3/22; F02C 6/003; F02C 7/224; F23R 3/40
See application file for complete search history.

(56) References Cited

U.S. PATENT DOCUMENTS

| | | |
|---|---|---|
| 3,313,103 A | 4/1967 | Johnson |
| 3,740,949 A | 6/1973 | Wolf et al. |

(Continued)

FOREIGN PATENT DOCUMENTS

| | | |
|---|---|---|
| CN | 107100736 A | 8/2017 |
| EP | 3517757 A1 | 7/2019 |

(Continued)

OTHER PUBLICATIONS

English translation of JPH10159551A (Year: 1998).*
European Search Report for European Application No. 22162576.7 dated Aug. 16, 2022.

*Primary Examiner* — Scott J Walthour
(74) *Attorney, Agent, or Firm* — Carlson, Gaskey & Olds, P.C.

(57) ABSTRACT

A turbo-expanding cracking assembly includes a plurality of stages each including a rotating blade coupled to an output shaft and a fixed stator, at least one heat exchanger configured to transfer heat to an ammonia containing fuel flow, and a catalyst that is configured to decompose an ammonia containing fuel flow into a flow containing hydrogen (H2).

29 Claims, 8 Drawing Sheets

(51) Int. Cl.
  *F23R 3/40*   (2006.01)
  *F02C 3/20*   (2006.01)
  *F02C 3/30*   (2006.01)
  *F02C 6/00*   (2006.01)

(56) References Cited

U.S. PATENT DOCUMENTS

| | | | |
|---|---|---|---|
| 6,357,217 B1* | 3/2002 | Griffin | F02C 3/30 |
| | | | 60/39.12 |
| 8,146,367 B2 | 4/2012 | Trimm et al. | |
| 2008/0236149 A1 | 10/2008 | Kyle | |
| 2008/0307768 A1* | 12/2008 | Trimm | C01B 3/386 |
| | | | 60/39.12 |
| 2012/0020841 A1* | 1/2012 | Bushuev | F01D 5/142 |
| | | | 422/129 |
| 2014/0243569 A1* | 8/2014 | Seppala | B01J 3/08 |
| | | | 585/653 |
| 2019/0084831 A1 | 3/2019 | Andersen et al. | |
| 2022/0154646 A1* | 5/2022 | Araki | F02C 7/22 |

FOREIGN PATENT DOCUMENTS

| | | | | |
|---|---|---|---|---|
| JP | H10159551 A * | 6/1998 | | F01N 3/28 |
| WO | 2020189566 A1 | 9/2020 | | |

* cited by examiner

TURBOEXPANDER INTER-STAGE HEATING AND NH3 CRACKING

CROSS-REFERENCE TO RELATED APPLICATIONS

This disclosure claims priority to U.S. Provisional Patent Application No. 63/164,020 filed Mar. 22, 2021.

BACKGROUND

A gas turbine engine typically mixes a carbon based fuel with air within a combustor where it is ignited to generate a high-energy exhaust gas flow. The high-energy exhaust gas flow includes carbon that is eventually exhausted into the environment. Alternative engine structures and fuels may aid in the reduction and/or elimination of carbon emissions. One such alternative fuel is ammonia.

Turbine engine manufacturers continue to seek further improvements to engine performance including improvements to reduce environmental impact while improving propulsive efficiencies.

SUMMARY

A turbo-expanding cracking assembly according to an exemplary embodiment of this disclosure includes a plurality of stages each including a rotating blade coupled to an output shaft and a fixed stator, at least one heat exchanger configured to transfer heat to an ammonia containing fuel flow, and a catalyst that is configured to decompose an ammonia containing fuel flow into a flow containing hydrogen ($H_2$).

In a further embodiment of the foregoing, the plurality of blade stages, the at least one heat exchanger and the catalyst are disposed within a common housing.

In a further embodiment of the foregoing, the catalyst includes a coating that is applied to at least one of the fixed stators.

In a further embodiment of the foregoing, the at least one heat exchanger is part of at least one of the fixed stators.

In a further embodiment of the foregoing, the at least one heat exchanger includes a first heat exchanger that is part of a first fixed stator and a second heat exchanger that is part of a second fixed stator.

In a further embodiment of the foregoing, a capacity for transferring heat into the ammonia containing fuel flow of the first heat exchanger is different than the second heat exchanger.

In a further embodiment of the foregoing, at least one of the rotating blades includes a catalyst coating.

In a further embodiment of the foregoing, the turbo-expanding cracker assembly includes a flow contacting surface that includes a catalyst coating.

In a further embodiment of the foregoing, the turbo-expanding cracker assembly includes a catalyst bed that is disposed within at least one of the plurality of stages.

In a further embodiment of the foregoing, a catalyst bed is disposed between the fixed stator and the rotating blade for each of the plurality of stages.

In a further embodiment of the foregoing, the plurality of stages includes a first plurality of stages and a second plurality of stages spaced axially apart with the at least one heat exchanger disposed therebetween.

In a further embodiment of the foregoing, the turbo-expanding cracker assembly includes a catalyst bed that is disposed downstream of the at least one heat exchanger and between the first plurality of stages and the second plurality of stages.

A gas turbine engine according to an exemplary embodiment of this disclosure includes a turbo-expanding cracking assembly in communication with an ammonia containing fuel flow, the turbo-expander cracking assembly includes at least one heat exchanger configured to transfer heat to the ammonia containing fuel flow, a catalyst that is configured to decompose the ammonia containing fuel flow into a flow containing hydrogen ($H_2$) than ammonia ($NH_3$) and a plurality of stages. Each of the plurality of stages includes a rotating blade coupled to an output shaft and a fixed stator. A combustor is configured to receive and combust a hydrogen flow that is communicated from the turbo-expander cracking assembly to generate an exhaust gas flow. A compressor section is configured to supply compressed air to the combustor. A turbine section is in flow communication with the exhaust gas flow that is produced by the combustor and mechanically coupled to drive the compressor section.

In a further embodiment of the foregoing, the catalyst includes a coating that is applied to at least one of the fixed stators.

In a further embodiment of the foregoing, the at least one heat exchanger of the turbo-expanding cracking assembly is part of at least one of the fixed stators.

In a further embodiment of the foregoing, the catalyst of the turbo-expanding cracking assembly includes a flow contacting surface coated with a catalytic material.

In a further embodiment of the foregoing, the turbo-expanding cracking assembly includes a catalyst bed that is disposed within at least one of the plurality of stages.

In a further embodiment of the foregoing, the plurality of stages includes a first plurality of stages and a second plurality of stages spaced axially apart with the at least one heat exchanger disposed therebetween.

In a further embodiment of the foregoing, the gas turbine engine includes a catalyst bed that is disposed downstream of the at least one heat exchanger and between the first plurality of stages and the second plurality of stages.

In a further embodiment of the foregoing, the gas turbine engine includes a secondary cracking assembly that is in communication with an outlet of the turbo-expanding cracking assembly to further decompose the ammonia containing fuel flow into a flow containing hydrogen ($H_2$).

In a further embodiment of the foregoing, an outlet of the secondary cracking assembly is in communication with the combustor for communicating a fuel flow containing hydrogen than ammonia ($NH_3$).

A gas turbine engine according to an exemplary embodiment of this disclosure includes a pump that is configured to increase a pressure of an ammonia containing fuel flow, a thermal transfer device that is configured to heat the ammonia containing fuel flow, a primary cracking assembly in communication with the ammonia containing fuel flow, the primary cracking assembly includes a catalyst that is configured to decompose the ammonia containing fuel flow into a first fuel flow containing hydrogen ($H_2$) and ammonia ($NH_3$). A turboexpander receives the fuel flow containing more hydrogen than ammonia from the primary cracking assembly, the turbo-expander includes a plurality of stages each including a rotating blade coupled to an output shaft and a fixed stator. A secondary cracking assembly is in communication with an outlet of the turbo-expander to further decompose the ammonia containing fuel flow into a second fuel flow containing hydrogen ($H_2$) and ammonia ($NH_3$). A combustor is configured to receive and combust at least one of the first fuel flow and the second fuel flow containing more hydrogen than ammonia to generate an exhaust gas flow. A compressor section is configured to supply compressed air to the combustor. A turbine section is in flow communication with the exhaust gas flow produced by the combustor and mechanically coupled to drive the compressor section.

In a further embodiment of the foregoing, heat from one of the combustor and turbine section is communicated to at least one of the primary cracking assembly and the secondary cracking assembly.

In a further embodiment of the foregoing, the second fuel flow is communicated to the combustor.

In a further embodiment of the foregoing, the second fuel flow is communicated to the secondary cracking assembly at a lower pressure and lower temperature than the first flow is communicated to the turboexpander.

A method of operating a gas turbine engine according to an exemplary embodiment of this disclosure includes communicating an ammonia containing fuel flow to a turbo-expanding cracker assembly that includes plurality of stages each including a rotating blade coupled to an output shaft and a fixed stator, transferring heat into the ammonia containing fuel flow within the plurality of stages of the turbo-expanding cracker assembly, decomposing the ammonia fuel flow with a catalyst disposed within the turbo-expanding cracking assembly into a flow containing hydrogen ($H_2$), and communicating the flow containing hydrogen ($H_2$) to a combustor configured to generate a gas flow.

In a further embodiment of the foregoing, the method further includes transferring heat into the ammonia containing fuel flow from at least one heat exchanger disposed between at least two rotating blades.

In a further embodiment of the foregoing, the at least one heat exchanger includes a portion of at least one of the fixed stators.

In a further embodiment of the foregoing, the method further includes decomposing the ammonia fuel flow with a catalyst disposed between at least two rotating blades.

In a further embodiment of the foregoing, the catalyst includes a coating applied to at least one of the fixed stators of the plurality of stages.

In a further embodiment of the foregoing, the catalyst includes a catalyst bed.

The present disclosure may include any one or more of the individual features disclosed above and/or below alone or in any combination thereof.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
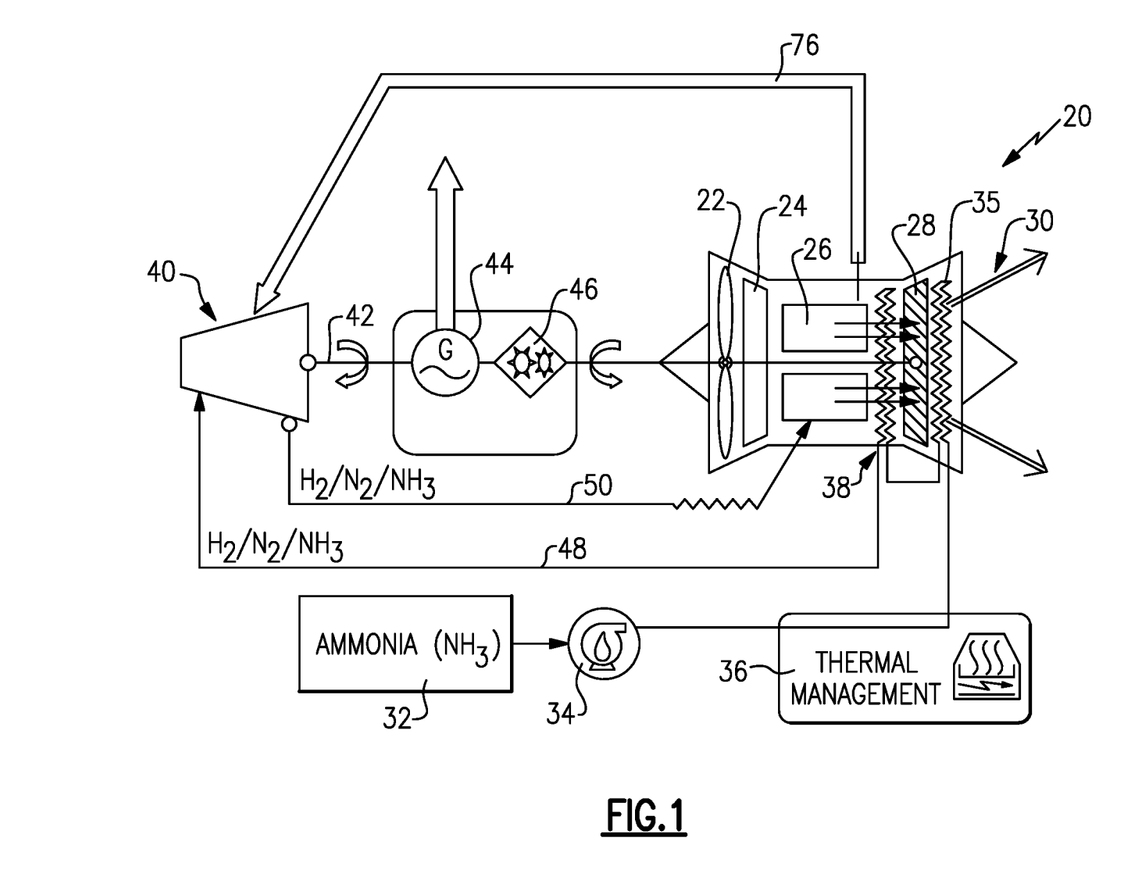
FIG. 1 is a schematic view of an example gas turbine engine assembly embodiment.

FIG. 1 schematically illustrates an example alternate fueled turbine engine assembly 20. The engine assembly 20 uses a hydrogen ($H_2$) containing fuel flow 50 generated from decomposition of ammonia ($NH_3$). The hydrogen fuel flow 50 is mixed with compressed air in a combustor 26 to generate a high energy gas flow 30 that expands through a turbine section 28 to drive a compressor 24 and a fan 22. It should be appreciated, that the engine 20 is shown schematically and that other structures and engine configurations such as 2-spool, 3-spool and geared turbofan engines would benefit from this disclosure and are within the contemplation and scope of this disclosure. Moreover, a land-based turbine engine would also benefit from application of the features of this disclosure.

Ammonia ($NH_3$) does not contain carbon, but does have a fuel energy similar to alcohols such as methanol. Ammonia can also be transported and stored in liquid form at moderate pressure and temperature. For example, ammonia is a liquid at a pressure of about 8.5 atm and a temperature of 20° C. Alternatively, ammonia is a liquid at a pressure of 1 atm and a temperature of −33° C. Moreover, because ammonia does not contain carbon it may be heated to temperatures above that of a hydrocarbon fuel without forming carbon deposits on portions of a fuel system. The increased temperature capabilities provide an increased heat sink capacity that can improve engine efficiency. Ammonia can be decomposed into hydrogen and nitrogen. Hydrogen provides improved combustion properties and a desirable clean burning fuel that does not generate undesirable exhaust products. Additionally, conversion of the ammonia fuel to a hydrogen fuel can reduce nitrous oxide emissions by eliminating the presence of fuel-bound nitrogen atoms, which are inherent to ammonia as a fuel.

The disclosed engine assembly 20 includes an example turbo-expanding cracker assembly (TEC) 40 that provides for both decomposition of ammonia into hydrogen and nitrogen and extraction of power from expansion of the decomposed ammonia fuel. The TEC 40 uses heat to decompose a flow of ammonia into hydrogen and nitrogen in the presence of a catalyst. The component parts of hydrogen and nitrogen and ammonia and communicated to the combustor 26 to produce the high energy gas flow 30 via combustion. The removal of ammonia from the fuel communicated to the combustor 26 can help to reduce the formation of nitrogen oxide emissions. Moreover, the reduction of ammonia from the fuel communicated to the combustor maximizes the amount of hydrogen burned to improve combustion efficiency and flame holding stability.

The ammonia is stored in a fuel storage tank 32 and pressurized by a fuel pump 34. The fuel pump 34 increases the pressure of the ammonia to a higher level and communicates the fuel flow to a primary cracking device 38 that uses heat produced by the core engine to decompose the pressurized ammonia. A thermal management device 36 may be provided between the pump 34 and the primary cracking device 38 to transform the liquid fuel flow into a mostly gaseous fuel flow. The pressurized and partially decomposed ammonia is communicated from the primary cracking device 38 to the turbo-expanding cracking assembly 40 to further decompose the fuel flow 48 and extract work by way of an output shaft 42.

Figure 2:
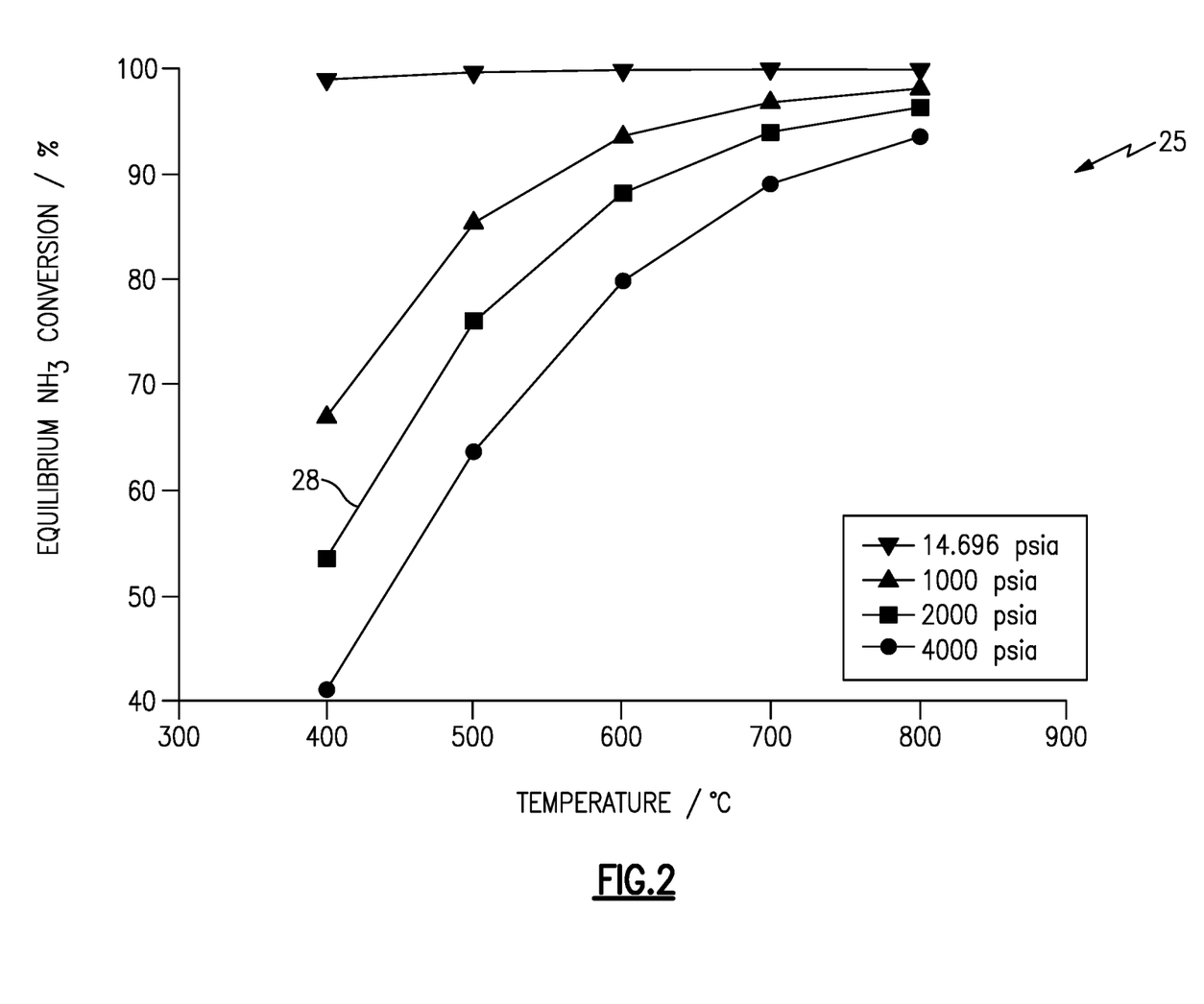
FIG. 2 is a graph illustrating decomposition fraction (in percent) at chemical equilibrium for different pressures and temperatures.

Referring to FIG. 2, with continued reference to FIG. 1, a graph 25 of the thermodynamic equilibrium decomposition fraction of ammonia into hydrogen and nitrogen as a function of temperature is shown. Decomposition of ammonia into its component parts of hydrogen and nitrogen occurs according to the according to the chemical equation:

$$NH_3 \rightarrow \tfrac{1}{2}N_2 + \tfrac{3}{2}H_2$$

The decomposition process of ammonia into component parts of hydrogen and nitrogen is performed in the presence of a catalyst at a given pressure and temperature as illustrated by the graph 25. The catalyst is typically composed of iron or ruthenium dispersed on a high surface area oxide, such as alumina, however other catalysts as are known are within the contemplation of this disclosure. The conversion process is limited by equilibrium based on pressure and temperature, as shown in graph 25, and therefore some residual ammonia may remain that is not decomposed. The decomposition process of ammonia into component parts does not need to be a complete or almost complete process to provide a useful amount of component products for combustion. In this disclosure, the residual ammonia refers to that amount of ammonia that is not yet decomposed. At very low pressures, a very high percentage of ammonia can be converted into hydrogen and nitrogen. The percentage of ammonia converted into component parts at pressures around 1 atm (14 psi) can approach 100% at temperatures above around 300° C. However, higher pressures are preferred to communicate the components of the fuel into the combustor 26.

The degree of conversion decreases as the pressure of the fuel flow increases. At pressures of around 68 atm (1000 psia), the degree of conversion is reduced to below 70% at 400° C. The degree of conversion at the same pressure increases with an increase in temperature. In this example, the conversion increases to over 80% at temperatures above around 500° C. Higher pressures require higher temperatures to achieve conversions above 80%. At a pressure of 136 atm (2000 psia), the temperature to achieve 80% conversion exceeds 500° C. At a pressure of 272 atm (4000 psia) the temperature to achieve 80% conversion exceeds 600° C. The lower conversions result in some quantity of residual ammonia that does not decompose and remains in the mixture. As decomposition progresses, the accumulation of hydrogen as a decomposition product slows the decomposition process until equilibrium is reached and decomposition stops; after this point decomposition can only proceed if either hydrogen or nitrogen is removed from the mixture.

The cracking process increases the number of moles, with one mole of ammonia NH3 becoming two moles of cracked gas, per $NH_3 \rightarrow \tfrac{1}{2}N_2 + \tfrac{3}{2}H_2$, such that the resulting cracked gas occupies more volume than the ammonia alone.

Figure 3:
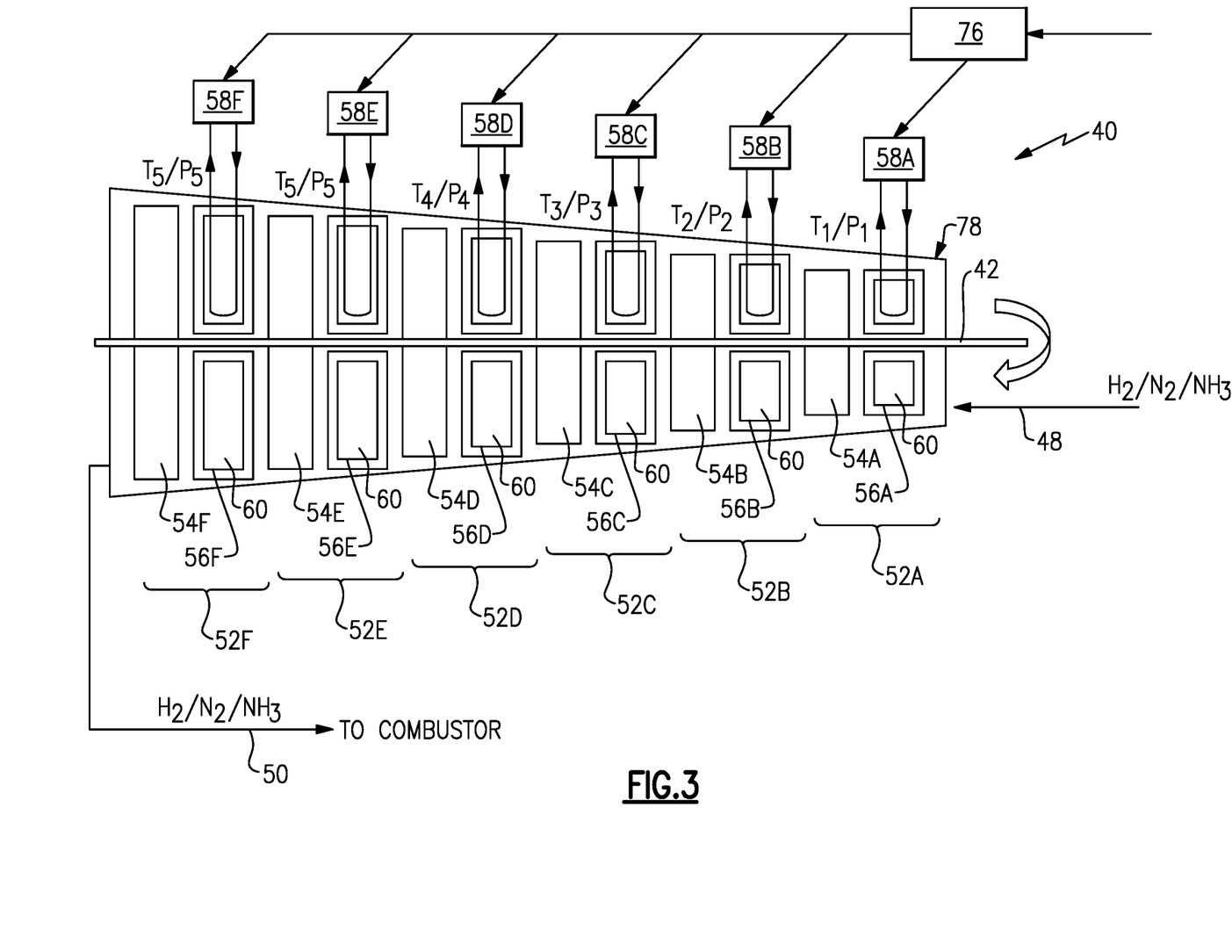
FIG. 3 is a schematic view of an example turbo-expanding cracking assembly embodiment.

Referring to FIG. 3 with continued reference to FIGS. 1 and 2, an example turbo-expanding cracking assembly 40 is schematically shown that provides for both extraction of work through an output shaft 42 and decomposition of ammonia fuel within a common housing 78. The ammonia decomposition in assembly 40 can be the primary means of decomposition, eliminating the need for cracking device 38, or it can further decompose the residual ammonia in stream 48. The example TEC 40 includes a plurality of stages 52A-F, each including at lease one rotating blade assembly 54A-F coupled to the output shaft 42 and at least one fixed stator assembly 56A-F. Each of the stages 52A-F are tailored to decompose an ammonia fuel flow dependent on the local temperatures and pressures $T_{1-5}$ and $P_{1-5}$. Although each of the plurality of stages 52A-F is shown with one blade rotating blade 54A-F and one fixed stator 56A-F, it is within the scope and contemplation of this disclosure that each of the plurality of stages 52A-F may include multiple rotating blades 54A-F and multiple fixed stators 56A-F.

Each of the fixed stators 56A-F in this disclosed embodiment of the TEC 40 include a heat exchanger 58A-F that receives heat energy schematically indicated at 76 from the engine assembly 20. Heat energy may be transferred from any suitable location and section of the gas turbine engine assembly 20. For example, systems that draw heat from the turbine section 28, or the exhaust nozzle 35 may be utilized and are within the contemplation of this disclosure.

The example TEC 40 provides for both the extraction of work due to the expansion of gases and the further decomposition of an ammonia containing fuel flow within a common volume defined within the housing 78. Each of the plurality of stages 52A-F includes a catalyst to promote decomposition and a heat exchanger 58A-F to maintain a desired temperature within each stage 52A-F that results in a desired decomposition of the ammonia containing fuel flow. The incoming ammonia containing fuel flow 48 enters the TEC 40 at a first pressure P1. The first pressure P1 is matched to a first temperature T1 within the first stage 52A to tailor decomposition. As the ammonia containing fuel flow moves to the second stage 52B, the pressure P2 will be less than the pressure P1. The second temperature T2 is matched to the second pressure to tailor decomposition conditions. As the ammonia containing fuel flow expands through the TEC 40, the corresponding pressure will drop in subsequent stages. In each of the stages 52A-F, the temperature $T_{1-5}$ is tailored to correspond with the local pressure $P_{1-5}$ within that stage that provides the desired decomposition of the ammonia containing fuel flow. In this way, the TEC 40 tailors the temperature of the ammonia containing fuel flow to provide a desired degree of decomposition.

The temperature within each of the stages 52A-F is controlled through operation of a corresponding heat exchanger 58A-F for that stage 52A-F. It should be appreciated that although a separate heat exchanger is shown for each of the stages, other combinations of heat exchangers could be utilized and are within the contemplation of this disclosure. Decomposition is further improved through the presence of catalytic material in each stage 52A-F. In this disclosed example embodiment, a catalytic coating 60 is applied to surfaces of each of the fixed stators 56A-F. The catalytic coating 60 may be of any composition understood to promote decomposition of ammonia.

Figure 4:
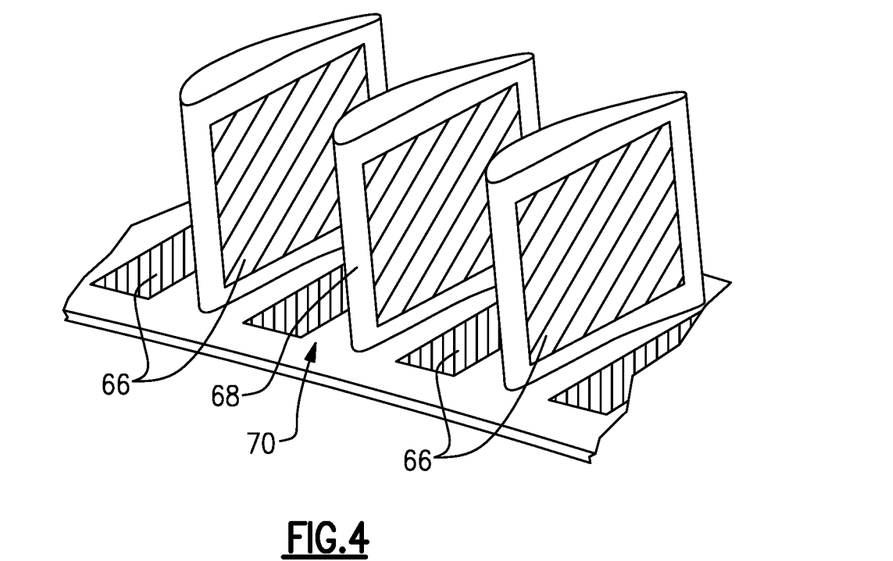
FIG. 4 is a schematic view of an example rotating blade embodiment.
Figure 5:
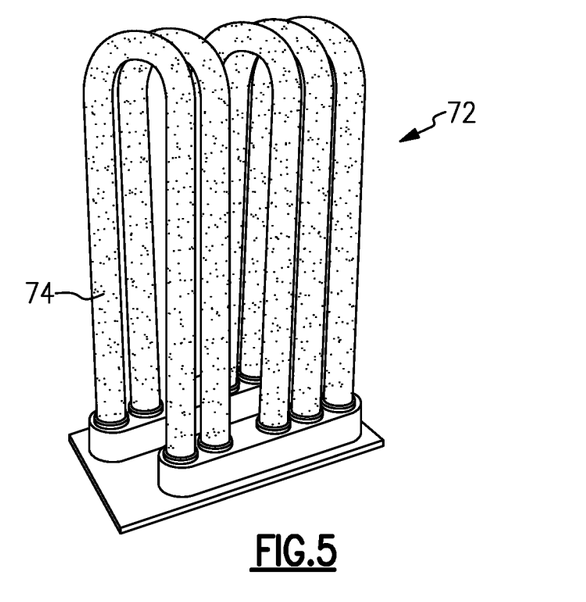
FIG. 5 is a schematic view of an example heat exchanger embodiment.

Referring to FIGS. 4 and 5, catalytic material may be applied to any surfaces within each of the stages including the rotating blades, blade platforms, hubs, and fixed surfaces such as stator vanes and endwalls. FIG. 4 schematically shows a catalytic coating 66 disposed on surfaces of a rotating blade 68. Additionally, catalytic coating 66 may be applied to platform surfaces 70 between the rotating blades 68. A similar arrangement of catalytic coating may be applied within a stator stage.

A heat exchanger 72 is schematically shown in FIG. 5 with a catalytic coating 74 applied to the heat transfer surfaces. The example heat exchanger 72 is a tube type exchanger, however, other configuration of heat exchanger could be utilized within the contemplation of this disclosure. The example heat exchanger 72 is disposed within the volume defined by the housing 78. The heat exchanger 72 may be included within the fixed stators 56A-F, which would then include the catalytic coating 74.

The resulting output of a hydrogen containing fuel flow 50 will be at a lower pressure than that of the ammonia containing fuel flow 48 input into the TEC 40. The hydrogen containing fuel flow 50 is communicated to the combustor for generation of the high energy exhaust gas flow 30. The amount of ammonia within the flow 50 is less than that within the flow 48. The flow 50 may carry some residual ammonia that could be drawn off prior to combustion.

The TEC 40 generates shaft power from the energy expended during expansion of the flow 48. The shaft power is communicated through the shaft 42 coupled to each of the rotating blades 54A-F. The shaft 42 may be coupled to drive a generator 44 and or a gearbox 46 for operating accessory items of the gas turbine engine 20. The shaft 42 may also be coupled to provide some portion of power to drive the fan 22. Although several examples are shown and disclosed by way of example, other devices and uses of power generated by the TEC 40 are within the contemplation and scope of this disclosure.

Figures 6, 7:
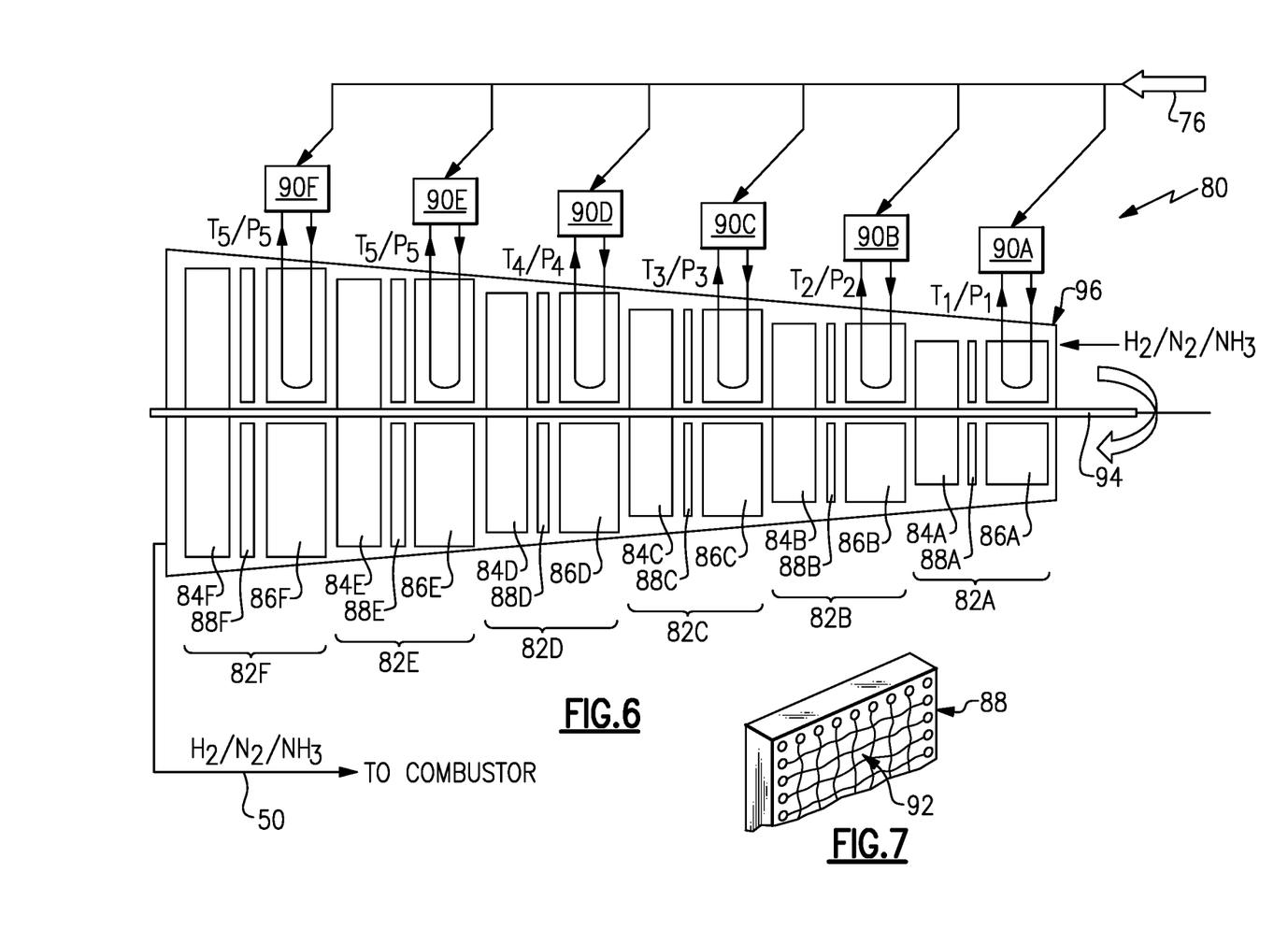
FIG. 6 is schematic view of another example turbo-expanding cracking assembly embodiment.
FIG. 7 a schematic view of an example catalyst bed embodiment.

Referring to FIGS. 6 and 7 with continued reference to FIG. 1, another example TEC 40 is schematically shown and includes a catalytic bed 88A-F within each of a plurality of stages 82A-F. Each catalytic bed 88A-F includes catalytic material 92 (FIG. 7) through which the ammonia containing fuel flow is directed. The catalytic material 92 may be in the form of pellets, honeycombs and/or any other catalytic configuration that promotes decomposition of ammonia. The size of each catalytic bed 88A-F is tailored to the conditions within each stage 82A-F. The inclusion of the catalytic beds 88A-F may be in addition to the coating of a catalytic material on surfaces within each stage 82A-F. The catalytic beds 88A-F may also be provided instead of application of coatings on the surfaces of corresponding blades 84A-F and stators 86A-F of each stage 82A-F. Moreover, in this disclosed example, each of the catalytic beds 88A-F is disposed between the fixed stator 86A-F and rotating blade 84A-F within each stage 82A-F. In this disclosed example, a catalytic bed 88A-F is disposed within each of the plurality of stages 82A-F. However, not every stage 82A-F may need a catalytic bed to generate the desired degree of decomposition. Accordingly, a catalytic bed may be arranged and grouped in different configurations through the TEC 80.

Figure 8:
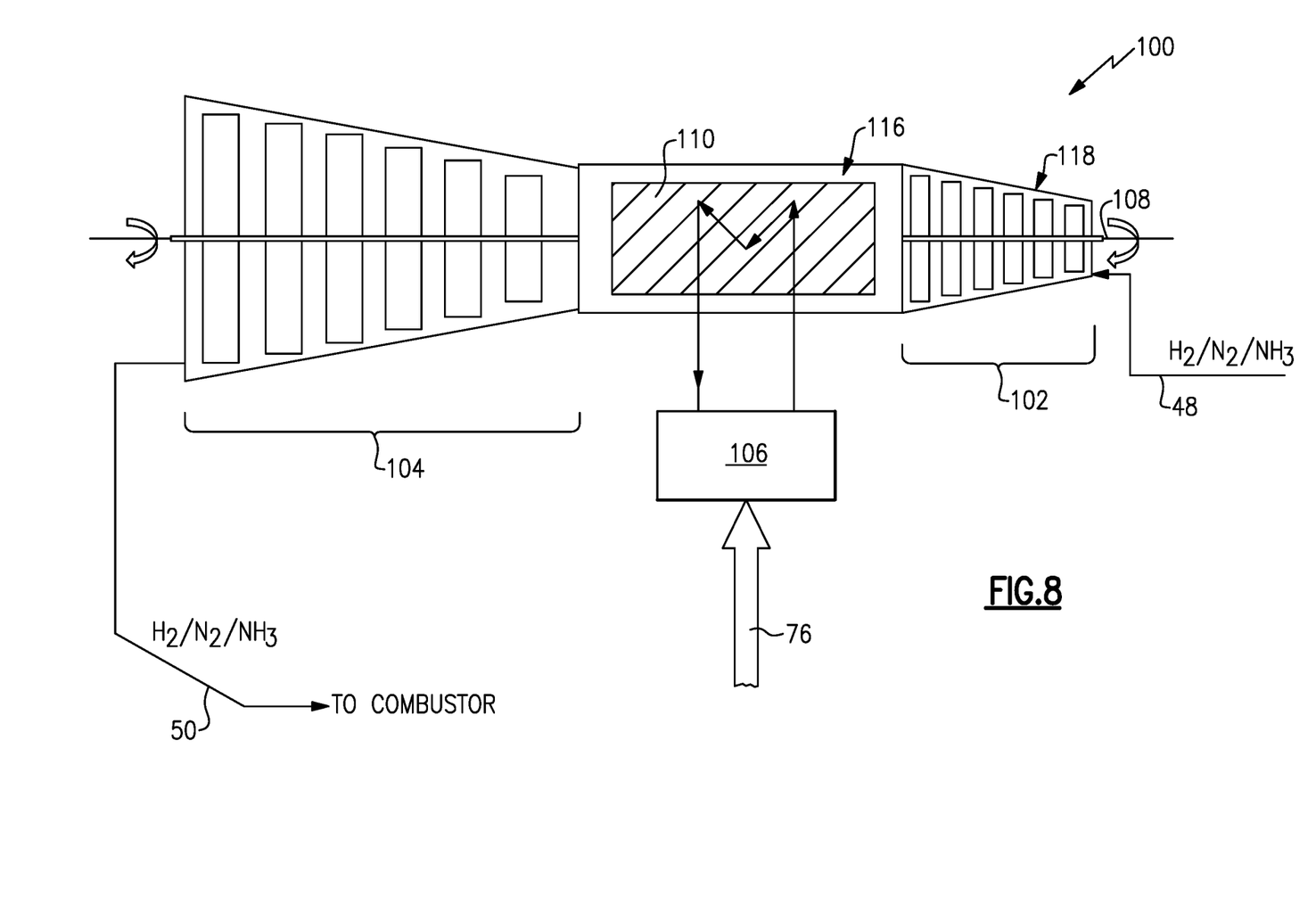
FIG. 8 is a schematic view of another example turbo-expanding cracking assembly embodiment.

Referring to FIG. 8 with continued reference to FIG. 1, another example TEC 100 is schematically shown and includes a first plurality of stages 102 separated axially from a second plurality of stages 104. A cracker assembly 116 is disposed axially between the first and second plurality of stages 102, 104 to promote decomposition of an ammonia containing fuel flow 48. The cracker assembly 116 is disposed within a common housing 118 with the first and second plurality of stages 102, 104. The cracker assembly 116 further includes a heat exchanger 106 that transfers heat indicated at 76 into the fuel flow in the presence of a catalytic material 110. The first and second plurality of stages 102, 104 may or may not have catalytic material such that decomposition is promoted within the cracking assembly 116 in the presence of heat provided by the heat exchanger 106.

Power is extracted by both the first plurality of stages 102 and the second plurality of stages 104 and output through the output shaft 108. Additional power is generated by re-heating the ammonia fuel flow within the cracker assembly 116 between the plurality of stages 102, 104. As described in the previous example embodiments each of the plurality of stages will include a rotating blade coupled to the output shaft and a fixed stator. The number of stages for each of the first and second plurality of stages may be the same or varied depending on application specific pressures, temperatures and power output requirements. The first plurality of stages 102 and the second plurality of stages 104 may provide power to a common shaft 108, or alternatively stages 102 and stages 104 may each output power on a separate shaft to allow operation at unequal rotational speeds.

Figure 9:
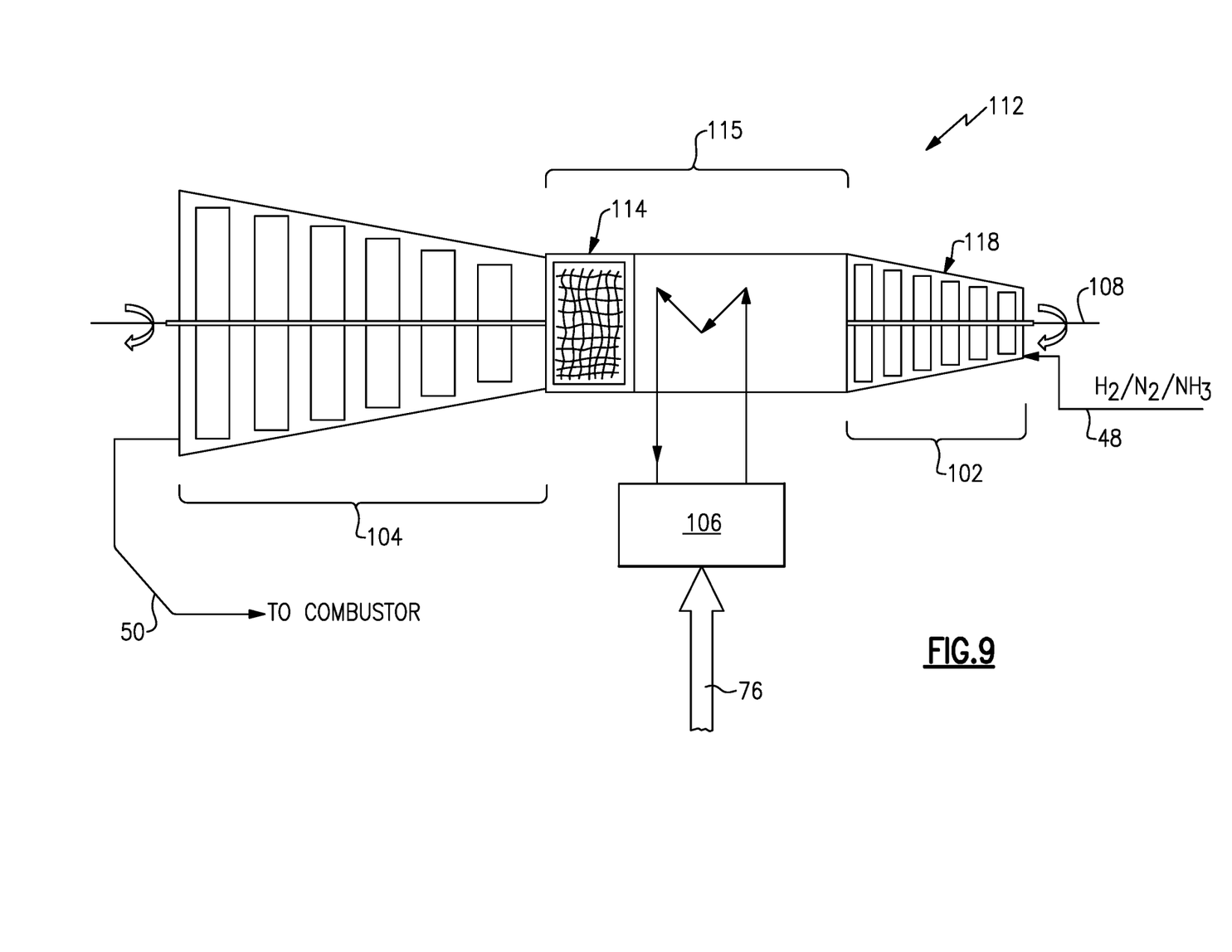
FIG. 9 is a schematic view of another example turbo-expanding cracking assembly embodiment.

Referring to FIG. 9, with continued reference to FIG. 1, another example TEC 112 is schematically shown and includes the addition of a catalytic bed 114 between the first plurality of stages 102 and the second plurality of stages 104. The example TEC 112 therefore includes a cracker assembly 115 with the heat exchanger 106 for re-heating the fuel flow and the catalytic bed 114 for promoting decomposition. The catalytic bed 114 may include catalytic material in the form of pellets, honeycombs and/or any other catalytic configuration that promotes decomposition of ammonia.

Figure 10:
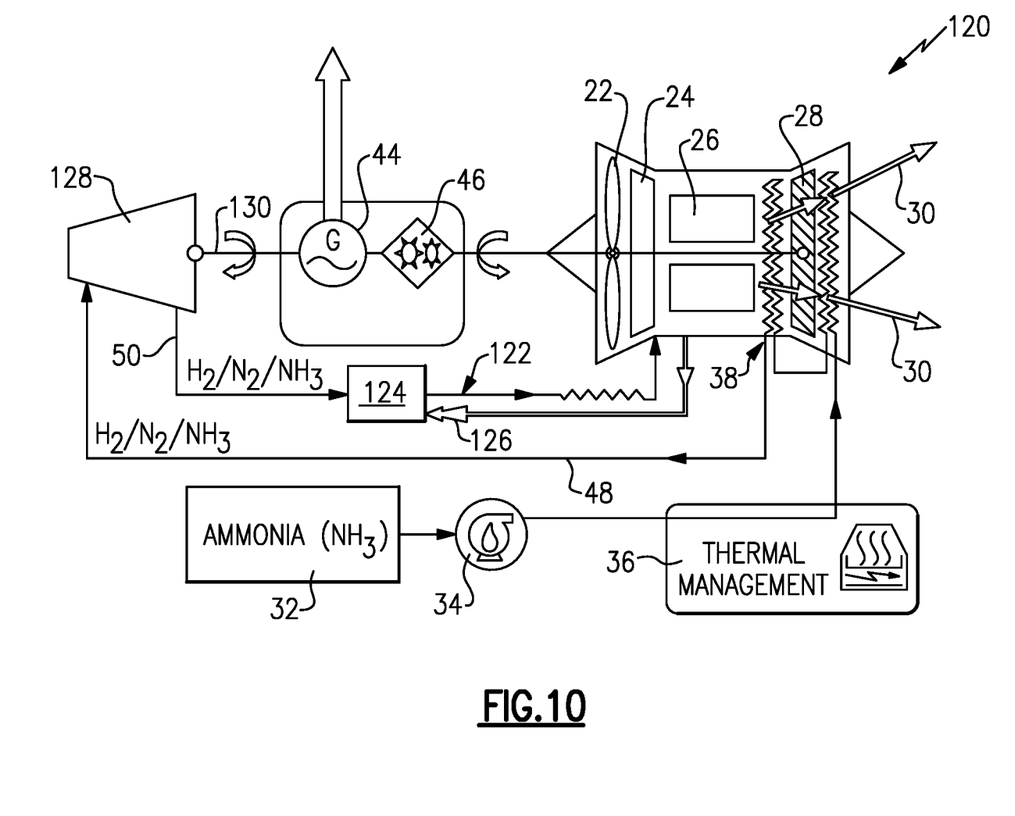
FIG. 10 is a schematic view of another example gas turbine engine assembly embodiment.

Referring to FIG. 10, another example gas turbine engine assembly 120 is schematically shown and includes a primary cracking assembly 38 that provides an initial decomposition of an ammonia containing fuel flow into a first fuel flow 48 that is directed to a turbo-expander 128. In the turbo-expander 128, work is extracted through expansion of the first fuel flow 48. The work from the turbo-expander 128 is output through a shaft 130 to power a generator 44, gearbox 46 and/or provide power to drive the fan 22. A second fuel flow 50 exhausted from the turbo-expander 128 is communicated to a secondary cracking assembly 124. Heat from the engine schematically indicated at 126 is input into the cracking assembly 125 to promote further decomposition of the ammonia containing fuel flow and provide a further decomposed fuel flow 122 to the combustor 26.

The fuel flow 50 exhausted from the turbo-expander 128 is at a lower pressure and temperature than the input fuel flow 48. As recognized in the graph 25 (FIG. 2), the maximum degree of decomposition increases with a reduction of pressure. Accordingly, the secondary cracking assembly 124 may further decompose the fuel flow to increase the quantity of decomposed hydrogen input into the combustor 26. The increased quantity of decomposed hydrogen can result in a cleaner burn of the fuel with a corresponding increase in efficiency and reduction in undesired combustion emissions.

Accordingly, the disclosed systems use advantageous properties of ammonia to maximize decomposition of ammonia into hydrogen fuel to reduce undesirable combustor emissions and improve engine efficiencies.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A method of operating a gas turbine engine, the gas turbine engine comprising:
    a turbo-expanding cracking assembly in communication with an ammonia-containing fuel source, the turbo-expander cracking assembly including:

a turbo-expander comprising:
  a housing;
  an inlet at an upstream end of the housing, the inlet configured to receive an ammonia containing fuel flow from the ammonia-containing fuel source;
  a catalyst within the housing configured to decompose the ammonia containing fuel flow into a hydrogen flow containing more hydrogen ($H_2$) than ammonia ($NH_3$); and
  a plurality of stages within the housing, downstream from the inlet, and configured to receive the ammonia containing fuel flow from the inlet, wherein each stage of the plurality of stages includes a rotating blade coupled to an output shaft and a fixed stator, each rotating blade configured to cause rotation of the output shaft in response to the ammonia containing fuel flow expanding through the plurality of stages;
  at least one heat exchanger within the housing and positioned within a stage or between stages and configured to transfer heat to the ammonia containing fuel flow;
  an outlet at a downstream end of the housing, the outlet configured to exhaust the hydrogen flow;
a combustor configured to receive and combust the exhausted hydrogen flow communicated from the turbo-expander cracking assembly to generate an exhaust gas flow;
a compressor section configured to supply compressed air to the combustor; and
a turbine section in flow communication with the exhaust gas flow produced by the combustor and mechanically coupled to drive the compressor section, the method comprising:
communicating the ammonia containing fuel flow to the turbo-expanding cracker assembly;
transferring heat into the ammonia containing fuel flow within the plurality of stages of the turbo-expanding cracker assembly;
decomposing the ammonia containing fuel flow with the catalyst into the hydrogen flow; and
communicating the hydrogen flow to the combustor to generate the exhaust gas flow.

2. The method as recited in claim 1, further comprising transferring heat into the ammonia containing fuel flow at a location between at least two rotating blades.

3. The method as recited in claim 2, wherein the at least one heat exchanger comprises a portion of at least one of the fixed stators.

4. The method as recited in claim 2, further comprising decomposing the ammonia containing fuel flow with the catalyst at a location between at least two rotating blades.

5. The method as recited in claim 4, wherein the catalyst comprises a coating applied to at least one of the fixed stators of the plurality of stages.

6. The method as recited in claim 4, wherein the catalyst is in a catalyst bed.

7. A turbo-expanding cracking assembly for providing a flow containing hydrogen (H2) to a combustor of a gas turbine engine, the turbo-expanding cracking assembly comprising:
  a turbo-expander comprising:
    a housing;
    an inlet at an upstream end of the housing, the inlet configured to receive an ammonia containing fuel flow;
    a plurality of stages within the housing, downstream from the inlet, and configured to receive the ammonia containing fuel flow from the inlet, each stage including a rotating blade coupled to an output shaft and a fixed stator, each rotating blade configured to cause rotation of the output shaft in response to the ammonia containing fuel flow expanding through the plurality of stages;
    at least one heat exchanger within the housing and positioned within a stage or between stages and configured to transfer heat to the ammonia containing fuel flow;
    a catalyst within the housing and configured to decompose the ammonia containing fuel flow into the flow containing hydrogen (H2); and
    an outlet at a downstream end of the housing, the outlet configured to exhaust the flow containing hydrogen (H2) for supply to the combustor.

8. The turbo-expanding cracking assembly as recited in claim 7, wherein the catalyst comprises a coating applied to at least one of the fixed stators.

9. The turbo-expanding cracking assembly as recited in claim 7, wherein the at least one heat exchanger is part of at least one of the fixed stators.

10. The turbo-expanding cracking assembly as recited in claim 9, wherein the at least one heat exchanger comprises a first heat exchanger that is part of a first fixed stator and a second heat exchanger that is part of a second fixed stator.

11. The turbo-expanding cracking assembly as recited in claim 10, wherein a capacity for transferring heat into the ammonia containing fuel flow of the first heat exchanger is different than a capacity for transferring heat into the ammonia containing fuel flow of the second heat exchanger.

12. The turbo-expanding cracker assembly as recited in claim 7, wherein at least one of the rotating blades includes a coating comprising the catalyst.

13. The turbo-expanding cracker assembly as recited in claim 7, including a flow contacting surface including a coating comprising the catalyst.

14. The turbo-expanding cracker assembly as recited in claim 7, wherein the catalyst is in a catalyst bed disposed within at least one of the plurality of stages.

15. The turbo-expanding cracker assembly as recited in claim 7, wherein the catalyst is in a respective catalyst bed disposed between the fixed stator and the rotating blade for each of the plurality of stages.

16. The turbo-expander cracker assembly as recited in claim 7, wherein the plurality of stages comprises a first plurality of stages and a second plurality of stages spaced axially apart with the at least one heat exchanger disposed therebetween.

17. The turbo-expander cracker assembly as recited in claim 16, wherein the catalyst is in a catalyst bed disposed downstream of the at least one heat exchanger and between the first plurality of stages and the second plurality of stages.

18. A gas turbine engine comprising:
  a turbo-expanding cracking assembly in communication with an ammonia-containing fuel source, the turbo-expander cracking assembly including:
    a turbo-expander comprising:
      a housing;
      an inlet at an upstream end of the housing, the inlet configured to receive an ammonia containing fuel flow from the ammonia-containing fuel source;
      a catalyst within the housing configured to decompose the ammonia containing fuel flow into a hydrogen flow containing more hydrogen (H$_2$) than ammonia (NH$_3$), and a plurality of stages within the housing, downstream from the inlet, and configured to receive the ammonia containing fuel flow from the inlet, wherein each stage of the plurality of stages includes a rotating blade coupled to an output shaft and a fixed stator, each rotating blade configured to cause rotation of the output shaft in response to the ammonia containing fuel flow expanding through the plurality of stages;

at least one heat exchanger within the housing and positioned within a stage or between stages and configured to transfer heat to the ammonia containing fuel flow;

an outlet at a downstream end of the housing, the outlet configured to exhaust the hydrogen flow;

a combustor configured to receive and combust the exhausted hydrogen flow communicated from the turbo-expander cracking assembly to generate an exhaust gas flow;

a compressor section configured to supply compressed air to the combustor; and a turbine section in flow communication with the exhaust gas flow produced by the combustor and mechanically coupled to drive the compressor section.

19. The gas turbine engine as recited in claim 18, wherein the catalyst comprises a coating applied to at least one of the fixed stators.

20. The gas turbine engine as recited in claim 18, wherein the at least one heat exchanger of the turbo-expanding cracking assembly is part of at least one of the fixed stators.

21. The gas turbine engine as recited in claim 18, wherein the turbo-expanding cracking assembly includes a flow contacting surface coated with a catalytic material comprising the catalyst.

22. The gas turbine engine as recited in claim 18, wherein the catalyst is in a catalyst bed disposed within at least one of the plurality of stages.

23. The gas turbine engine as turbo-expander cracker assembly as recited in claim 18, wherein the plurality of stages comprises a first plurality of stages and a second plurality of stages spaced axially apart with the at least one heat exchanger disposed therebetween.

24. The gas turbine engine as recited in claim 23, wherein the catalyst is in a catalyst bed disposed downstream of the at least one heat exchanger and between the first plurality of stages and the second plurality of stages.

25. The gas turbine engine as recited in claim 24, including a secondary cracking assembly in communication with the outlet of the turbo-expanding cracking assembly to further decompose ammonia contained in the hydrogen flow.

26. The gas turbine engine as recited in claim 25, wherein an outlet of the secondary cracking assembly is in communication with the combustor for communicating the hydrogen flow.

27. A gas turbine engine comprising:
a pump in communication with an ammonia-containing fuel source, the pump configured to increase a pressure of an ammonia containing fuel flow from the ammonia-containing fuel source;

a thermal transfer device configured to heat the ammonia containing fuel flow;

a primary cracking assembly in communication with the ammonia containing fuel flow, the primary cracking assembly including a catalyst configured to decompose the ammonia containing fuel flow into a first fuel flow containing hydrogen (H$_2$) and ammonia (NH$_3$);

a turbo-expanding cracking assembly including:
a turbo-expander comprising:
a housing;
an inlet at an upstream end of the housing, the inlet configured to receive the first fuel flow from the primary cracking assembly;
a catalyst within the housing configured to decompose the first fuel flow such that the first fuel flow contains more hydrogen (H$_2$) than ammonia (NH$_3$);
a plurality of stages within the housing, downstream from the inlet, and configured to receive the first fuel flow from the inlet, wherein each stage includes a rotating blade coupled to an output shaft and a fixed stator, each rotating blade configured to cause rotation of the output shaft in response to the first fuel flow expanding through the plurality of stages;
at least one heat exchanger within the housing and positioned within a stage or between stages and configured to transfer heat to the first fuel flow; and
an outlet at a downstream end of the housing, the outlet configured to exhaust the first fuel flow;

a secondary cracking assembly in communication with an outlet of the turbo-expander to further decompose ammonia contained within the first fuel flow to produce a second fuel flow containing hydrogen (H$_2$) and ammonia (NH$_3$);

a combustor configured to receive and combust the second fuel flow to generate an exhaust gas flow;

a compressor section configured to supply compressed air to the combustor; and a turbine section in flow communication with the exhaust gas flow produced by the combustor and mechanically coupled to drive the compressor section.

28. The gas turbine engine as recited in claim 27, wherein heat from one of the combustor and the turbine section is communicated to at least one of the primary cracking assembly and the secondary cracking assembly.

29. The gas turbine engine as recited in claim 27, wherein the first fuel flow is communicated to the secondary cracking assembly at a lower pressure and a lower temperature than the first fuel flow is communicated to the turboexpander.

* * * * *